Nov. 17, 1970       G. B. FOSTER ET AL       3,541,435
NONCONTACT DIMENSION COMPARATOR EMPLOYING CONSTANT
FREQUENCY AND AMPLITUDE PICKUP VIBRATION
Filed April 22, 1968                 3 Sheets-Sheet 1

INVENTORS
GEORGE B. FOSTER
EUGENE R. LUCKA

BY

*LeBlanc & Shur*

ATTORNEYS

INVENTORS
GEORGE B. FOSTER
EUGENE R. LUCKA
BY

*Le Blanc & Shur*
ATTORNEYS

INVENTORS
GEORGE B. FOSTER
EUGENE R. LUCKA

BY

*Le Blanc & Shur*

ATTORNEYS

United States Patent Office 3,541,435
Patented Nov. 17, 1970

3,541,435
NONCONTACT DIMENSION COMPARATOR EMPLOYING CONSTANT FREQUENCY AND AMPLITUDE PICKUP VIBRATION
George B. Foster, Worthington, and Eugene R. Lucka, Columbus, Ohio, assignors to Reliance Electric & Engineering Co., Columbus, Ohio, a corporation of Ohio
Filed Apr. 22, 1968, Ser. No. 723,185
Int. Cl. G01r 27/26; H02m 5/00
U.S. Cl. 324—61                                          20 Claims

ABSTRACT OF THE DISCLOSURE

There is disclosed herein a noncontact dimension comparator including a proximity sensitive pickup coupled to a driver to vibrate the pickup at fixed amplitude and frequency toward and away from an object to be inspected. Measurement is achieved by analyzing the time variation of a signal corresponding to the pickup sensitivity variations. An arbitrary zero is established and measurements are represented as positive and negative departures from the arbitrary zero. Since the pickup sensitivity is a non-linear function of distance, means are disclosed to linearize the pickup output. Also, means are disclosed to provide a drive signal of constant frequency and amplitude for pickup vibration by direct frequency multiplication of an input AC power supply signal.

---

The present invention relates to a noncontact dimension comparator. Such a device is used in the manner of a dial indicator for numerous industrial purposes, e.g., high speed classification of part dimensions, inspection of interrupted surfaces, gears, splines, etc., check-out of machine tool runout and spindle drift, inspection of polished, soft, wet, contaminated, or explosive surfaces, etc.

Noncontact dimension comparators have been manufactured by applicants' assignee and are disclosed in its copending U.S. patent application Ser. No. 333,335, filed Dec. 26, 1963 in the names of George B. Foster et al., now U.S. Pat. No. 3,379,972, dated Apr. 23, 1968, and application Ser. No. 515,533, filed Dec. 22, 1965 in the name of George B. Foster, now U.S. Pat. No. 3,379,972, dated July 24, 1969.

The apparatus disclosed in the aforementioned Foster et al. and Foster patent applications employ proximity sensitive pickups adapted to be vibrated or "shaken" at constant frequency and controlled amplitude in relationship to the object under inspection. A feedback control system operates to adjust the shake amplitude as a function of standoff distance between the probe tip and the object under inspection to maintain the constant amplitude of the pickup output signal at the shake frequency. Under such conditions, the ratio of shake amplitude to standoff distance is maintained constant as different portions of the object under inspection pass in front of the pickup whereby the pickup output signal at the shake frequency is linearly related to the standoff distance.

The latter feature is desirable in many instances, for example, in noncontact thickness measurement where two dimensional comparator devices are placed on opposite sides of the object being inspected, and a signal representing the difference between the standoff distances to the two pickups is used as an indication of thickness. As another example, a linear relationship between standoff distance and measurement signal permits direct readout on a linar recorder or meter.

Devices of this type have proven quite satisfactory as a substitute for contact gauging or as a means of surface inspection where surface contact is impermissible. In certain instances, however, limitations on the foregoing systems have been noted and effort has been directed toward devising improvements intended to expand the utility of the noncontact dimension comparator concept.

For example, several arrangements have been employed to shake the pickup, including a piezoelectric crystal driver and electromagnetic drivers similar to loudspeaker voice coils. The piezoelectric type driver is preferred for several reasons, but presents difficulties in that variations in internal power dissipation in the crystal driver may cause a change in the properties of the material, e.g., the electrical-to-mechanical motion conversion parameters may vary with AC drive voltage and crystal temperature. This presents little problem in a continuous gauging operation where the pickup is constantly maintained in operative relationship to a relatively large or continuous object being inspected. However, during piece comparison procedure, pieces to be inspected are alternately brought into and out of proximity with the pickup. Thus, the probe alternately looks at empty space (with an effective infinite standoff distance) then at an object at a small standoff distance. Since the shake amplitude is maintained proportional to the standoff distance, piece inspection results in large variations in the pickup drive amplitude with corresponding large variations in crystal driver power dissipation. The practical result may be a substantial and unsatisfactory delay in obtaining a stable reading under these conditions.

Another difficulty has been encountered where a highly linear relationship between standoff distance and the measurement output signal is critical. The various types of proximity sensitive pickups employed are all characterized by a sensitivity function F of the type:

$$F(S)=K/S^n \tag{1}$$

where S is the standoff distance between the object under inspection and the probe tip, K is a sensitivity constant, and $n$ is any number, ordinarily between about 1 and 3. In the case of capacitive pickups, which are frequently employed, an ideal value of $n=1.0$ would be expected in Equation 1. Unfortunately, even with well designed pickups, unavoidable trade-off problems result in a sensitivity where $n$ is not exactly equal to 1.0. The previously described linearization technique essentially involves the feedback of a distance signal and therefore, for a practical capacitive pickup ($n \neq 1.0$), perfect linearity cannot be achieved. Even for moderate departures from $n=1.0$, linearity variations exceeding about 5%, a generally acceptable limit, may result.

A further problem area is in the accurate control of the shake frequency of pickup vibration. Good frequency control is necessary to assure precise identification of the shake signal by frequency sensitive circuit elements and to assure reliable signal amplitude measurement. Fairly accurate frequency control may be achieved with a free-running multivibrator employing power line synchronization but rapid and reliable lock-in may be difficult to obtain at the time of turn-on and over the long term of operation. Thus, with a multivibrator and line synchronization, a small degree of asynchronism may result in low frequency "beats" in the pickup vibration drive signal and correspondingly in the output measurement.

The present invention seeks to overcome the above described limitations on the universal utility of the noncontact dimension comparator concept by modifying the basic circuit design in certain respects. These modifications have been successful and have resulted in expanded utility in areas such as surface following, contour analysis, wall thickness, and surface measurement of hollow bodies of relatively complex shape, etc.

Briefly, in accordance with this invention, a noncontact dimension comparator system includes a proximity sensitive pickup shaken at a regulated constant frequency and amplitude obtained by direct powerline frequency multiplication. In a preferred embodiment, a capacitive pickup opeartes to modify the output frequency of an RF oscillator in response to variations in the pickup to object spacing. Signal recovery at the pickup vibration frequency is attained by circuitry including an FM crystal discriminator. Suitable AFC circuitry operates in response to the discriminator output to maintain constant frequency control for the RF oscillator-FM demodulator combination. The distance analog signal output of the discriminator at the shake freqeuncy is either used as a direct measure of the pickup to object spacing, or is first linearized by the use of an arbitrary gain function sensitivity control. For non-contact dimension comparison, circuitry is provided to establish an arbitrary zero position with measurements being indicated by positive and negative variations from the reference.

One particular feature of the above described invention is the departure from the variable amplitude pickup vibration previously employed. Here, constant pickup vibration of fixed amplitude and frequency is imparted to the probe with the resulting distance dependent output signal at the pickup vibration frequency being analyzed to provide distance measurement. As a result, the distance dependent "motion feedback" and control of the pickup drive is elminated, together with the inherent linearization which it produces. This is not critical since, for many applications, a linear output is not necessary. Where it is desired, it can be provided in accordance with another feature of this invention by the use of an arbitrary gain-function sensitivity control. For example, an adjustable gain amplifier having a plurality of linear amplitude dependent sensitivity settings is used to produce effective linearization of the pickup output signal. This actually possesses an advantage over the motion feedback in that it permits satisfactory matching of all sensitivity functions:

$$F(S) = K/S^n \qquad (2)$$

whereas motion feedback linearization is most successful for $n$ very near 1.0.

Another feature of the invention is the accurate control of pickup vibration frequency by utilization of a line frequency harmonic obtained by direct multiplication of the power line signal as the probe drive frequency. This is achieved by a novel frequency conversion and amplitude control circuit which operates to produce a regulated output signal at double the input frequency, independent of the input signal amplitude over a wide range. This circuit includes a full wave rectifier doubler, high pass filter coupled to a limiter amplifier to produce a square wave of constant amplitude and fixed frequency, equal to twice the input frequency. For sinusoidal signal recovery, the square wave is passed through a narrow band filter at the desired frequency. One or more such frequency doubler-amplitude control circuits may be cascaded to produce the desired input frequency harmonic.

Use of such an arrangement permits pickup vibration at an essentially fixed frequency without synchronization or lock-in problems and without generation of low frequency beats due to slight asynchronims. Also, the amplitude limiting assures constant probe vibration amplitude, independent of line voltage fluctuation.

Accordingly, it is an object of this invention to provide improved apparatus for non-contact dimension comparison.

It is a more specific object of this invention to provide a noncontact dimension comparator employing a non-contact proximity sensitive pickup vibrated at a controlled amplitude and frequency in which the pickup output signal at the vibration frequency serves as indication of the distance from the pickup to the surface under inspection.

It is a further specific object of this invention to provide a noncontact dimension comparator as described above in which the pickup is vibrated at constant amplitude and frequency and in which the average signal amplitude at the vibration frequency serves as a measure of the distance from the pickup to the object under inspection.

It is also an object of this invention to provide a non-contact dimension comparator as described above having an arbitrary gain function sensitivity control to linearize accurately the distance dependent sensitivity of the pickup.

It is another object of this invention to provide a noncontact dimension comparator in which the pickup is vibrated at a power line frequency harmonic obtained by direct line frequency multiplication.

It is a related object of this invention to provide a noncontact dimension comparator employing power line frequency harmonic vibration obtained by use of one or more frequency doublers operating to generate exact harmonics of the line frequency and including constant amplitude control means to assure a constant pickup vibration amplitude independent of line voltage fluctuations.

Another object of this invention is to provide a non-contact dimension comparator employing a proximity sensitive pickup driven at fixed frequency and amplitude obtained by direct power line frequency multiplication and amplitude regulation, the distance dependent sensitivity of the pickup serving to modify the frequency of a high frequency oscillator in response to distance variations, and including signal recovery apparatus to isolate the signal components at the pickup vibration frequency, an arbitrary gain-function sensitivity compensation to linearize the relationship between the vibration signal component amplitude and the pickup to object spacing, and utilizing circuitry to establish an arbitrary zero position permitting dimensional comparision based on positive and negative departures from the reference point.

It is also an object of this invention to provide a frequency doubler circuit comprising a full wave bridge rectifier, a high pass filter coupled to a limiter amplifier providing a fixed amplitude zero average value square wave at double the input frequency and including a narrow band filter circuit to recover the sinusoidal fundamental component of the double frequency square wave.

The exact nature of the invention, together with other objects and advantages thereof, will be apparent from consideration of the following detailed description in conjunction with the attached drawing in which.

Figure 1:
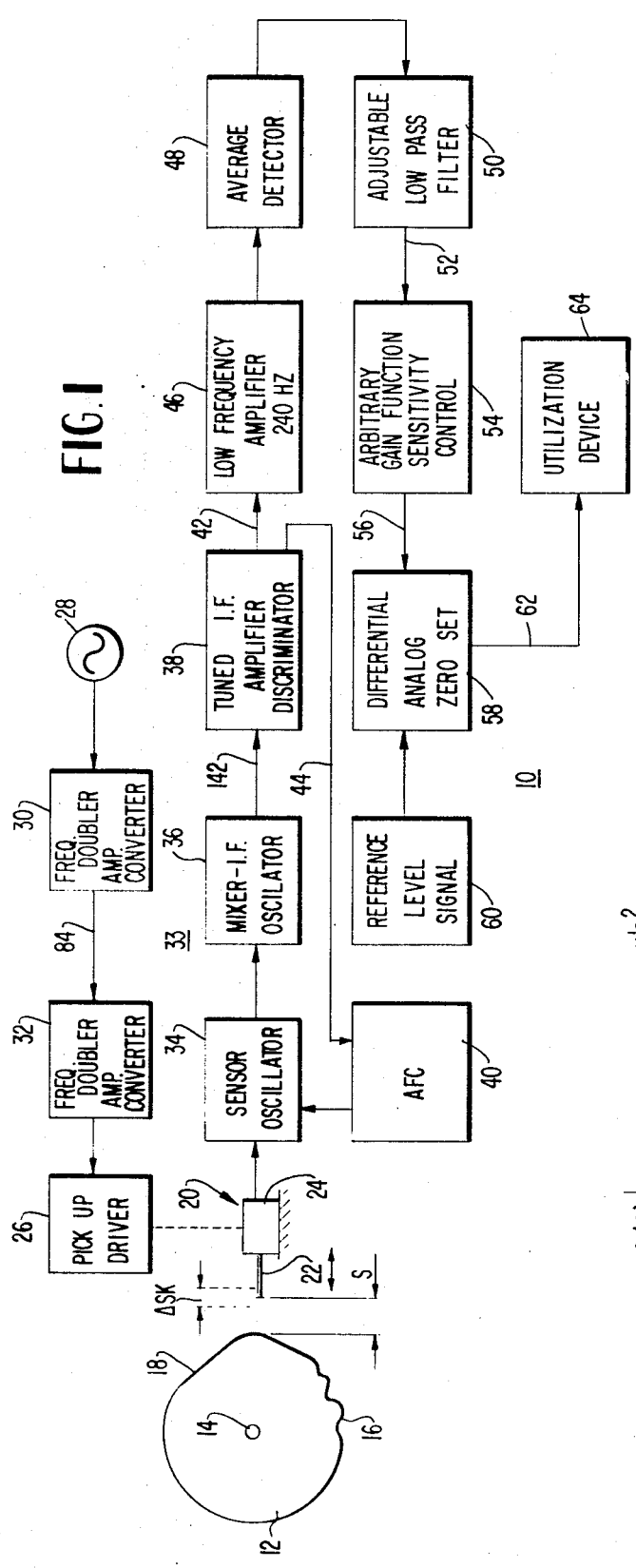
FIG. 1 is an overall block diagram showing the noncontact dimensional comparator of this invention.

With reference now to FIG. 1, there is shown an overall block diagram of a non-contact dimension comparator in accordance with this invention, generally denoted at 10. Device 10 is used for surface inspection or dimensional measurement of a wide variety of objects, indicated for example by a circular part 12 slowly rotating about a central axis 14. Indicative of the types of dimensional and surface variations and imperfections to be identified is an area of surface ripple 16 and an extended flat spot 18 on part 12, both shown grossly exaggerated for clear illustration.

Dimension comparator 10 includes a proximity sensitive pickup 20 having a movable probe tip 22 and a rigidly mounted case 24. A pickup driver 26 is mechanically coupled to vibrate pickup probe tip 22 at a controlled amplitude and frequency in the direction indicated by the two-headed arrow, i.e., toward and away from the object 12 under inspection. As previously mentioned, pickup driver 26 may be any suitable electromechanical device capable of converting an electrical oscillation into a mechanical vibration but is preferably a charge responsive device such as a piezoelectric crystal driver. Suitable piezoelectric crystal drivers are disclosed, for example, in the aforementioned Foster et al. and Foster patent applications and also in assignee's copending U.S. patent application Ser. No. 553,263, filed May 17, 1966 in the name of George B. Foster, entitled "Non-Contacting Vibration Analyzer."

Briefly, a preferred piezoelectric crystal driver comprises a pair of piezoelectric discs or plates separated by a metallic spacer. Conductive electodes ae attached to the outer surfaces of the piezoelectric elements. The entire assembly is rigidly supported at its periphery and is mechanically coupled at its center to the pickup probe tip. Under the influence of a suitable electrical drive signal applied through the conductive electrodes, the driver unit, and the attached pickup probe tip are set in motion at the frequency of the drive signal.

In system 10, the drive signal for crystal driver 26 is an amplitude regulated line frequency harmonic obtained by direct frequency multiplication of a power line input signal. Thus, for a conventional 60 Hz. input indicated schematically at 28, a pickup drive signal at 240 Hz. is obtained by a pair of series connected frequency doubler-amplitude regulator circuits 30 and 32; with frequency doubler 30 converting the input 60 Hz. signal into an amplitude regulated signal at 120 Hz. and frequency doubler 32 converting the 120 Hz. signal to an amplitude regulated 240 Hz. signal which operates crystal driver 26 and pickup probe tip 22 at the desired constant amplitude and frequency.

Pickup 20 preferably constitutes a variable capacity probe which may be regarded electrically as an electrical impedance element whose capacitance C(S) varies with the probe tip to object spacing S in accordance with the previously stated functional relationship:

$$C(S) = K/S^n$$

where K is a sensitivity constant and $n$ is a small positive number. As will be appreciated, under ideal conditions, with a purely capacitive pickup, $n=1.0$, and pickup 20 provides the simple inverse distance sensitivity associated with the parallel plate capacitor.

Transformation of the varying pickup capacitance into a useful distance analog signal is preferably accomplished by means of a frequency modulation data channel 33 including a sensor oscillator 34, a mixer-IF oscillator 36, and a tuned IF amplifier-discriminator 38 and a feedback AFC circuit 40. Functionally, the frequency modulation data channel operates in a generally conventional fashion, with the varying capacitance of pickup 20 coupled into the frequency determining circuit of sensor oscillator 34 to produce a variable frequency oscillation, the instantaneous frequency of which depends on the standoff distance S. The high frequency output of sensor oscillator 34 includes components as follows:

(a) An RF "rest" frequency corresponding to the oscillation frequency of sensor oscillator 34 when the capacity of pickup 20 is zero (i.e., S very large or no object 12 within the sensitivity range of pickup 20).

(b) Frequency modulation at the pickup vibration rate having a frequency deviation depending on the instantaneous standoff distance including surface variation within the range of pickup sensitivity.

(c) Additional frequency modulation at a rate below that of the pickup vibration and with deviation depending directly upon the instantaneous standoff distance.

The above described modulated output of sensor oscillator 34 is coupled to mixer-IF oscillator 36 which includes a fixed frequency oscillator and multiplication circuitry to produce "sum" and "difference" frequency shifted versions of the spectrum of the output of sensor oscillator 34. For example, in a suitable operative embodiment, the rest frequency of sensor oscillator 34 may be 5.124 mHz. and the mixer oscillator frequency may be 5.585 mHz. The resulting difference signal centered at 461 kHz. includes all of the above listed signal components and is preferred for further signal processing for well known and conventional reasons.

The output of mixer 36 is connected to tuned IF amplifier-discriminator circuit 38 including one or more resonant amplifier circuits operating at the desired intermediate frequency to reject the signal spectra centered around the original sensor-oscillator frequency, around the mixer "sum" frequency, as well as the IF oscillator frequency signal itself. The resulting IF signal is then transformed by suitable discriminator circuitry to recover the actual signal component measured by pickup 20. Thus, the discriminator output provided over lead 42 includes the following components.

(d) A signal center at 240 Hz. corresponding to the pickup vibration signal and having an amplitude depending upon the standoff distance;

(e) A DC component corresponding to the average standoff distance;

(f) Low frequency components of amplitude and frequency depending on the instaneous standoff distance and on surface and dimensional variations in the object under inspection;

(g) An additional signal spectrum centered at the shake frequency and corresponding to the low frequency and small amplitude surface and dimensional variations of the object under inspection.

An additional output from discriminator 38 is provided over a lead 44 to an automatic frequency control circuit 40 which continually adjusts the sensor oscillator output frequency to maintain the discriminator output signal at substantially zero when no object is within the field of sensitivity of pickup 20. In the present case, the sensor oscillator frequency is continuously adjusted on the basis of the discriminator output so that the difference frequency output of the mixer-IF oscillator 36 is exactly at 461 kHz.

The signal output from discriminator 38 is provided over lead 42 to a low frequency tuned amplifier circuit centered at the shake frequency. This in turn is connected to an average detector circuit 48 and low pass filter 50 to recover a signal representative of the average standoff distance between the object under inspection and the probe 22 (i.e., signal component (d) previously identified). Also, the surface characteristic modulation of the pickup drive signal (signal component (g) above) may be recovered by suitable amplitude demodulation techniques, if the maximum surface variation frequency is well below the pickup vibration frequency, by at least one order of magnitude. This has the advantage of providing an inherently directional pickup response, i.e., not affected by pickup interaction with portions of the object under inspection not directly axially of the vibrating pickup. Average detector 48 is therefore adjusted to respond to the surface variation signals so that the latter may be recovered from the displacement analog signal appearing on lead 52.

As previously explained, the functional relationship between standoff distance S and the pickup output signal is frequently a complex distance function. This complex function may be modified by linearization if desired in order to permit convenient recording or thickness measurement. Thus, the distance analog signal appearing on lead 52 is connected through an arbitrary gain function sensitivity control 54 to produce a linearized distance analog signal on lead 56. To achieve this result, sensitivity control 54 includes a series of amplitude sensitive gain adjustments each individually controlled to provide a specified constant gain within a limited region of operation. This allows establishment of a piecewise linear approximation to a sensitivity function resulting in a composite linearized distance analog signal $E_L(S)$ in the form:

$$E_L(S)\text{-}K'S \qquad (4)$$

Finally, in order to permit establishment of an arbitrary zero point for dimension comparison, a differential analog circuit 58 receives the linearized distance analog signal $E_L(S)$ over lead 56 and a second input from a reference level signal source 60. The amplitude of the reference signal is adjusted to provide a zero signal level over lead 62 for an arbitrary position of the object under inspection relative to pickup 20. The differential analog signal on lead 62 is then connected to any suitable utilization device 64 such as a meter, recorder, etc. to provide the desired measurement or other function.

Before describing system operation as a whole, a more detailed description of certain of the circuit units comprising system 10 will now be presented, with reference to FIGS. 2 through 8.

Figures 2, 4:
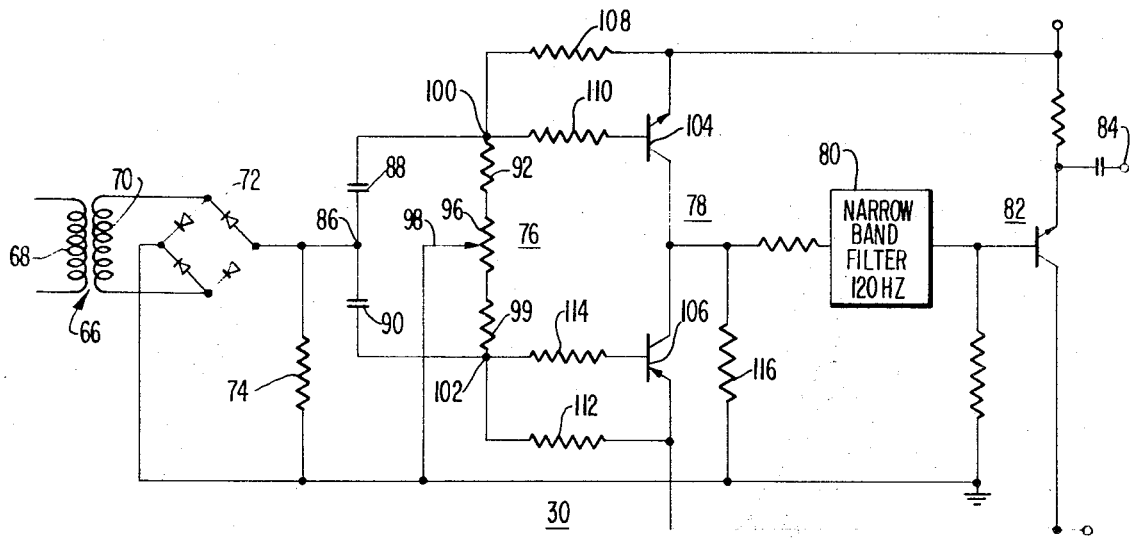
FIG. 2 is a circuit diagram of a frequency doubler and amplitude control circuit in accordance with this invention.
FIG. 4 is a circuit diagram of a suitable high frequency sensor oscillator.

FIG. 2 shows the circuit design of frequency doubler-amplitude regulator 30, i.e., that which converts the input 60 Hz. signal to an amplitude controlled signal at 120 Hz. As illustrated, frequency doubler 30 comprises an input transformer 66 having primary winding 68 connected to the 60 Hz. powerline and secondary winding 70 connected as an input to a fullwave bridge rectifier circuit 72. A load resistor 74 constituting the output of bridge 72 is connected through a highpass filter network 76 to a dual transistor limiter amplifier circuit 78. The amplifier output is resistance coupled to a sharply tuned filter circuit 80 with its resonant frequency at twice the input frequency, i.e., 120 Hz. for doubler circuit 30. The output of filter 80 is coupled through an emitter follower output circuit 82 which in turn provides the 120 Hz. input at terminal 84 to frequency doubler 32.

Figure 3:
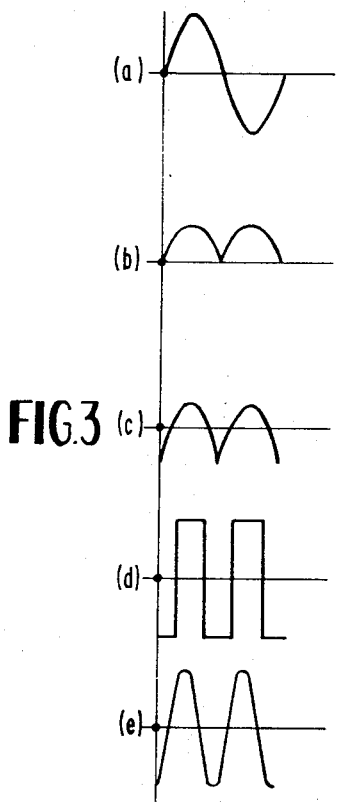
FIG. 3 is a wave form diagram for the circuit of FIG. 2.

With additional reference now to the waveforms shown in FIG. 3, fullwave rectifier circuit 72 produces a double frequency pulsating signal across load resistor 74. The input sinusoidal and the resulting double frequency signal are shown as waveforms (a) and (b) respectively in FIG. 3. Referring again to FIG. 2, the double frequency signal is coupled to high pass filter circuit 76 which is actually formed of two identical high pass RC filters including series capacitors 88 and 90 and shunt resistors 92 and 94. The shunt paths to ground for both RC filters is completed by a common potentiommeter 96 connected at its ends to resistors 92 and 94 and to ground through its arm 98.

The time constants of the two RC networks are the same except for differences due to adjustment of potentiometer 96. However, for proper operation, the two time constants must always be large in comparison to the period of the double frequency waveform. For the 120 and 240 Hz. waveforms here involved, capacitors 88 and 90 may be 4.7 mfd. and resistors 92 and 94 may be 180,000 ohms; potentiometer 96 may be 250,000 ohms. Under such conditions, the filter output waveforms at terminals 100 and 102 are quite similar and are of the form shown in line (c) of FIG. 3.

Limiter amplifier 78 comprises a pair of complementary transistors 104 and 106 together with associated biasing resistors and output circuitry. The biasing circuitry for npn transistor 104 includes a resistor 108 together with input resistor 110, shunt resistor 92, and common potentiometer 96, while the biasing circuitry for pnp transistor 106 includes resistor 112, along with input resistor 114, shunt resistor 94, and common potentiometer 96. A common output load to ground is provided by a resistor 116.

Circuit values are chosen so that small positive or negative voltages quickly overdrive the transistors producing the highly rectangular double frequency waveform shown at line (d) of FIG. 3. Potentiometer 96 permits duty cycle symmetry adjustment by variation of the transistor bias levels to produce a square output with essentially zero average value.

In order to recover a sinusoidal signal from the double frequency square wave, the signal appearing across resistor 116 is coupled to bandpass filter 80 resonant at the square wave fundamental frequency, i.e., the second harmonic of the input waveform. Filter 80 may be of any suitable or desired construction but should be sufficiently selective to prevent passage of all signals present except the desired square wave fundamental. In practice, attenuation of 20 db per octave on each side of the center frequency is sufficient. The resulting double frequency waveform is shown in line (e) of FIG. 3. The circuit output may be provided by means of a conventional emitter follower output stage 82 and with capacitive coupling to an output terminal 84.

Comparison of waveforms in lines (a) and (e) of FIG. 3 reveals that the output signal frequency is in fact twice that of the input waveform. On the other hand, the amplitude regulation provided by limiter amplifier 78 assures constant peak-to-peak amplitude independent of fluctuations of the input signal. The second frequency doubler circuit 32 is essentially identical to circuit 30 except that the tuned filter is centered at a frequency twice that of tuned filter 80, i.e., 240 Hz. for the present application. As will be appreciated, however, frequency doublers 30 and 32 are of general utility and can provide a regulated amplitude line frequency harmonic for any purpose.

FIG. 4 shows the significant features of RF sensor oscillator 34. Actually, several conventional feedback oscillator configurations may be employed. In the present instance, a Colpitts type oscillator with collector-to-base feedback in the configuration shown in FIG. 4 is preferred. A transistor 118 serves as the oscillator with the resonant frequency being determined by a feedback circuit 120 including capacitors 122 and 124, in series with an inductor 126 and a parallel combination of a third capacitor 128 and a variable capacity diode, e.g., a varicap 130. The latter operates as part of AFC network 40 described more fully hereinafter. These circuit elements together determine the rest frequency of oscillator 118. This frequency is varied to reflect dimensional or surface variations of the object under inspection by addition of a shunt capacitance in parallel with capacitors 122 and 124 indicated schematically by capacitor 132 which, in reality, constitutes the distance sensitive variable capacity of pickup 20. Thus, whenever an object under inspection approaches sufficiently close to pickup 20 that capacitor 132 assumes a substantial value in relationship to capacitors 122 and 124, the oscillator frequency will depart from its rest value resulting in output components reflecting the probe tip to object spacing, as well as surface and dimensional features to be inspected.

The oscillator output is RC coupled to the base of an emitter follower circuit 134 which serves in conventional fashion to reduce the effective oscillator output impedance for convenient cable transmission of the sensor oscillator output. In this regard, it will be appreciated that the small capacitances involved, and the correspondingly high frequencies, e.g., pickup capacity on the order of .1 pf. and oscillator frequencies on the order of 5 mHz. or more, stray capacitance and noise effects may critically degrade system performance. In order to minimize such effects, appropriate shielding techniques should be utilized. As an example, frequency determining elements 122, 124, and 126 should preferably be maintained in close proximity to the pickup probe tip and the remaining portions of the oscillator circuit. This may be accomplished by locating the entire circuit shown in FIG. 4 within the housing 24 of pickup 20 (see FIG. 1). In addition, critical frequency determining elements 122, 124, 126 should be enclosed in a suitable low dielectric constant insulated capsule as close as is practical to probe tip 22. Then, by virtue of the impedance conversion effects of common emitter transistor 134, suitable cable lengths may be employed between oscillator 34 and mixer-IF oscillator 36. Likewise, the voltage control signal provided to variable capacity diode 130 is of low frequency and little or no difficulty is encountered in use of a cable connection between AFC circuit 40 and sensor oscillator 34.

Mixer-IF oscillator 36 shown schematically in FIG. 1, is of entirely conventional construction and detailed description is not believed necessary. As previously indicated, mixer 36 simply serves to introduce a frequency reduction between the center frequency of sensor oscillator 34 in order to permit more convenient subsequent processing.

Figure 5:
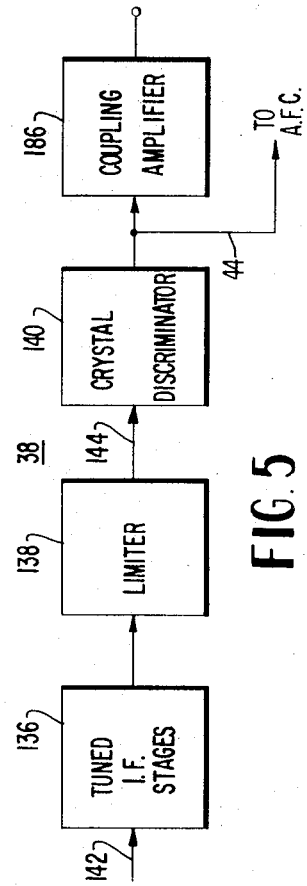
FIG. 5 is a block diagram of a tuned IF amplifier-discriminator.

Tuned IF amplifier-discriminator 38 is also generally of conventional construction but includes certain features believed worthy of further description. As shown in FIG. 5, tuned IF amplifier-discriminator combination 38 includes one or more tuned IF stages 136, a limiter 138, and a crystal discriminator 140 of any suitable construction.

The mixer output appearing on lead 142 includes signal components centered at the sensor oscillator frequency, "sum" and "difference" frequencies resulting from mixer operation together with a single frequency component at the IF oscillator frequency itself. All of the foregoing signals, except the "difference" frequency and its associated spectrum, are eliminated by the tuned amplifier stages 136 so that the resulting signal appearing at the input of limiter 138 contains only the IF signal and the associated spectrum corresponding to the distance sensitive capacity variations of pickup 20.

In accordance with conventional FM practice, the frequency modulated IF signal is amplitude limited in order to eliminate amplitude modulation prior to frequency demodulation. This may be accomplished by means of any suitable limiter circuit, and no specific description is believed necessary.

Figure 6:
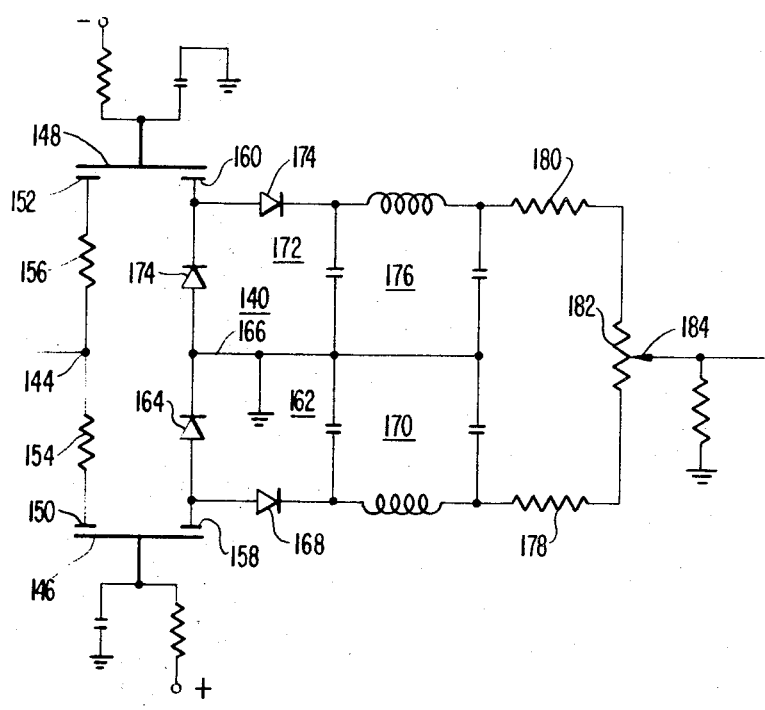
FIG. 6 is a circuit diagram of a discriminator constituting a portion of the system of FIG. 5.

The limiter output at terminal 144 is coupled to a highly stable crystal discriminator circuit 140, shown in FIG. 6. Discriminator circuit 140 includes a pair of crystal filters 146 and 148 resonant at equally displaced frequencies above and below the IF signal center frequency. Crystals 146 and 148 each include an input "motor" portion 150 and 152 driven through one of resistors 154 and 156 from the limiter output on lead 144. The induced mechanical vibration is coupled to receiver portions 158 and 160 with maximum transmission at the resonant frequency and with rapid fall off for even small departures from resonance. The frequencies between the two resonance peaks constitute the bandpass of the crystal filter pair. For an IF center frequency of 461 kHz., upper frequency filter 146 may be resonant at 465 kHz. while lower frequency filter 148 may be resonant at 457 kHz., providing a total bandpass of ±4 kHz.

Each of crystal filters 146 and 148 is connected to a rectifier circuit-filter combination which provides amplitude demodulation of the crystal filter outputs. A first rectifier circuit 162 is connected to crystal filter 146 and includes a diode 164 coupled to crystal output 158 with the polarity shown so that positive signal is shunted directly to ground at 166. A second diode 168 is series connected to crystal output 158 so that negative signal components pass on to an LC ripple-filter circuit 170. A rectifier circuit 172 includes a first diode connected to output 160 of crystal 148 to shunt negative signal components to ground and a second diode 174 series connected to crystal output 160 to pass positive signal components to a second LC ripple-filter circuit 176, identical to filter 170 previously described.

Filter circuits 170 and 176 are coupled through a pair of series resistors 178 and 180 to opposite sides of a summing potentiometer 182. The output of filter 170 is a negative signal while the output of filter 176 is a positive signal with the amplitude of each decreasing with departure from the resonance frequency of the respective crystal discriminator 146 or 148. Circuit parameters including the position of potentiometer arm 184 are adjusted so that the signal levels on summing potentiometer 184 cancel each other at the IF center frequency. On the other hand, the negative signal amplitude at the output of resistor 178 predominates with increasing frequency while the positive signal amplitude at resistor 180 predominates with decreasing frequency. Thus, the amplitude dependent frequency deviation about the IF center frequency corresponding to the variations in pickup capacity are reconverted into an amplitude analog signal varying between positive and negative amplitudes at the actual rate of pickup capacity variation. As will be appreciated, the result is a conventional discriminator amplitude versus frequency characteristic. However, the crystal detector circuit described above is preferable to the conventional tuned transformer discriminator circuit since it exhibits much better frequency stability and reliability in operation.

Referring again to FIG. 5, the discriminator output is coupled to a coupling amplifier 186 of any suitable design. Also, the discriminator output is coupled through a lead 44 to AFC circuit 40. This operates to control the frequency of RF sensor oscillator 34 by varying the capacitance of variator diode 130 (see FIG. 4) to maintain a zero signal level at the IF center frequency. Any suitable AFC circuitry may be employed for this purpose and no detailed description is deemed necessary.

Referring to FIGS. 1 and 5, the output signal components from amplifier 186 in discriminator 38 of most interest are, at the pickup vibration frequency (e.g., 240 Hz.) and at least the first component of the 240 Hz. amplitude modulation spectrum corresponding to surface variations in the object under inspection. The instantaneous amplitude of the signal at the pickup vibration frequency depends on the instantaneous probe tip to object spacing and therefore may be measured to obtain an analog of this distance. Measurement of the standoff distance from the zero and other low frequency components of the pickup output cannot be be done with satisfactory accuracy due to absence of calibration and due to small RF sensor oscillator frequency drift, while the signal amplitude at the pickup vibration frequency and its AM spectrum provides an easily measured and reliable distance analog signal.

The pickup shake frequency signal changes with dimensional and/or surface variations of the object under inspection as it travels through the field of sensitivity of the pickup but for sufficiently low frequencies, conventional average detection circuitry can be employed. The required slow variation of the standoff distance relative to the pickup vibration period can be assured with the system of FIG. 1 as long as the rotation of object 12 is well below the pickup vibration frequency. For example, with the 240 Hz. shake frequency, rotational speeds below about 1200 r.p.m. (20 Hz.) present no practical difficulties.

The required average detection is achieved by passing the discrimiinator output signal appearing on lead 42 through tuned low frequency amplifier 46, e.g., a suitable multi-stage amplifier with a twin-T filter feedback circuit. For best results at a shake frequency of 240 Hz., the bandpass of amplifier 46 should be about 220–260 Hz. The amplifier output is passed through average detector 48 which is conected to adjustable low pass filter 50. The latter completes the amplitude demodulation yielding at lead 52 the desired amplitude analog signal representative of the time varying changes in standoff distance.

It is again desirable to emphasize that the information being obtained is actually an amplitude modulation of a 240 Hz. carrier and that the extent of the AM spectrum depends on the spatial frequencies and rotational speeds of the surface variations in question. For sufficiently slow rotation of the object 12 under inspection, low frequency phenomena, such as runout or flat spot 18, as well as higher frequency phenomena, such as surface ripple 16, are contained in the output signal. For higher rotational speeds, however, only the low frequency variations can be recovered with good accuracy. This is due to the possible presence of shake frequency subharmonics as well as to inherent limits on the frequency relations for successful demodulation. To insure operation in a range capable of accurate signal recovery, the passband of amplifier 46 and the cut-off frequency for filter 50 are chosen to impose a frequency limit on the order of, at most 50%, and preferably about 10% of the shake frequency. In the present case, amplifier 46 has a passband of about 40 Hz. and filter 50 cuts off at about 20 Hz.

Figure 7:
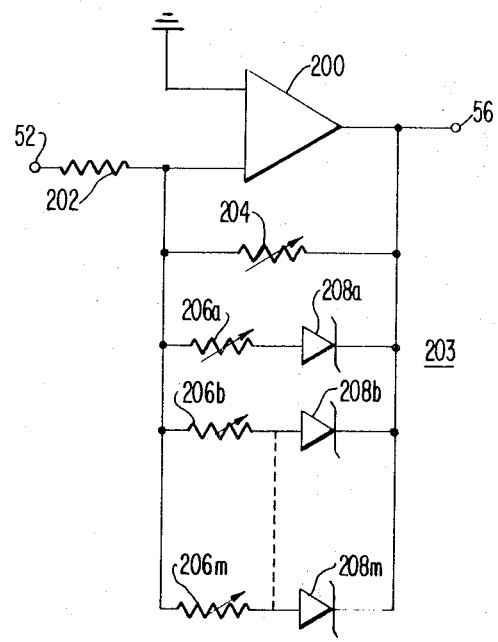
FIG. 7 is a circuit diagram of a suitable arbitrary gain function synthesizer for linearizing the distance dependent pickup sensitivity.

As previously explained, linearization of the pickup sensitivity function may be accomplished by use of an arbitrary gain function sensitivity control 54. This circuit operates to provide a piecewise linear approximation to the desired amplitude dependent sensitivity function for converting the pickup signal into one whose amplitude is a simple linear function of the standoff distance. A suitable embodiment for arbitrary gain function sensitivity control 54 is shown in FIG. 7. This control is achieved by use of an adjustable amplitude sensitive feedback network connected between the input and output of a high gain amplifier. The circuit consists of high gain amplifier 200, e.g., an operational amplifier, an input resistance 202 connected between signal lead 52 and the amplifier input and a feedback network 203 connected between amplifier output 56 and the input summing point (virtual ground) for amplifier 200. Feedback network 203 comprises a plurality of parallel branches which cooperate to establish the voltage transfer function for amplifier 200. This first parallel branch includes a variable resistor 204 while all remaining branches include an adjustable resistor 206a through 206m and Zener diodes 208a through 208m. Diodes 208a through 208m are selected to have progressively higher breakdown voltage. Preferably, for simplicity, the breakdown points of all diodes should be equally spaced, although the nature of the gain function to be produced may dictate some variation in this. However, fairly well-matched series of Zener diodes of the type desired can be obtained commercially, e.g., types 1N753A, 1N754A, 1N755A. . . .

Diodes 208a–208m are connected in the polarity shown so that as the amplifier output voltage at terminal 56 increases, successive ones of diodes 208a through 208m begin to conduct, bringing the associated variable resistor 206a through 206m into effective parallel relationship with adjustable resistor 204. Each resistance brought into the parallel combination causes a progressive decrease of the total feedback resistance, i.e., as the amplifier output voltage increases, the total effective feedback resistance decreases. Accordingly, for a feedback amplifier configuration shown with extremely high open loop amplifier gain, the closed loop voltage transfer function may simply be regarded as the ratio of the total feedback resistance (i.e., the effective value of the parallel resistance combination) divided by the input resistance value of the input resistance (i.e., the value of resistor 202). Therefore, as the amplifier input increases, the output will also increase (disregarding sign change) but the progressive increase of the number of parallel resistances 206a through 206m results in progressively decreasing amplifier gain at increased input level. As will be appreciated, the setting of resistors 204 and 206a through 206m determines the exact total parallel resistance and therefore the actual amplifier gain function for a given voltage input.

The functional operation of the gain adjustment circuit 54 may be appreciated from recollection that the pickup sensitivity and the corresponding displacement analog signal E(S) are in the form:

$$E(S)=K/S^n$$

while the desired linearized displacement analog signal $E_L(S)$ is desired to be in the form:

$$E_L(S)=AS$$

Accordingly, a gain function G(S) such that $$E(S)G(S)=E_L(S)=AS$$

can be used to linearize the pickup sensitivity. For example, with E(S) in the form previously specified, and $n=1$:

$$G(S)=AS^2/K=K'S^2$$

Figure 8:
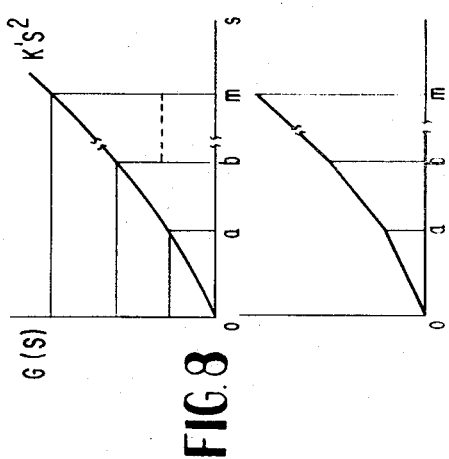
FIG. 8 is a waveform diagram showing the operation of the circuit of FIG. 7.

The segmented linear approximation to G(S) can be obtained as illustrated in FIG. 8. Here, the upper waveform represents the desired gain function $K'S^2$. The S axis is divided into a sequency of segments a, b, . . . m and the actual function G(S) is to be approximated between each segment by a straight line as indicated in the lower waveform. The initial segment between $S=0$ and $S=a$ is approximated by the linear gain achieved solely with feedback resistor 204, the second segment between $S=a$ and $S=b$ is approximated by the gain achieved with the parallel combination of resistors 204 and 206a, etc. for as many segment approximations as are desired.

The actual approximation scheme may be of several types, e.g., each linear segment may be adjusted to pass through the end points 0,0; a,G(a); b,G(b). . . . Alternatively, the approximation may be based on the slope of G(S) at some point, e.g., the center of each segment. Other approximation schemes may also be employed or a combination of various techniques may be employed where necessary to achieve the desired degree of linearity.

Actually, the exact nature of the approximation scheme is not critical since a given pickup 20 will exhibit variation in its distance sensitivity curve requiring separate calibration of gain adjustment network 54 for that pickup. This could be done in several ways: For example, a specially cut cam may be rotated within the field of view of the pickup to produce a smooth test variation in S over the expected measurement range, and potentiometers 206a–206m set visually to obtain the desired linear sensitivity.

The linearized distance analog signal provided at lead 56 may be employed without further processing as an absolute measure of the pickup to object spacing S, but in many practical instances will be used as a comparison signal, to indicate departure from an arbitrary reference distance. Thus, the differential analog (zero set) circuit 58 and reference level signal generator 60 are employed in the manner previously described to establish an arbitary zero level for the signal on lead 62. The variations above and below the arbitrary zero are reflected as signal changes fed to utilization device 64.

Typical operation of the above described system may be summarized as follows: An initial calibration and esstablishment of arbitrary zero position is achieved by positioning the vibrating pickup 20 relative to the field of view or a specific object to be inspected so that a satisfactory initial standoff distance reading is obtained. This may be accomplished by use of a micrometer adjusted fixture (not shown) for positioning pickup housing 24 in desired relationship relative to an object holding fixture or to the object actually under inspection.

Choice of a satisfactory initial standoff distance and shake amplitude will ordinarily depend on the expected range of surface or dimensional variations to be measured. Generally speaking, a large amplitude of pickup vibration in relation to the probe tip to object spacing produces the best signal to noise ratio. On the other hand, the standoff distance should be substantially in excess of the expected dimensional or surface variations in order to prevent pickup or surface damage as a result of contact. In one practical embodiment, surface and dimensional variations on the order of ±3.0 mils about an arbitrary zero point can be measured. For full scale readings up to this value and as low as ±1.0 mil, a standoff distance of about 6 mils is satisfactory. For smaller ranges of measurements, e.g., ±0.3 mil and down to as low as ±0.03 mil, a standoff distance of 2.0 mils is preferable. In both cases, a shake amplitude of 1.0 mil peak to peak is employed.

After setting the standoff distance in accordance with the foregoing, reference level signal adjustment 60 is set to produce a zero meter reading with the object to be inspected within range of the pickup. Then, the surface to be inspected is brought within the feld of view of the pickup. For example, in the case of circular rotating object 12, the entire object surface is inspected by slow rotation about axis 14 for a rotational speed sufficiently small in relation to the frequency of pickup vibration, e.g., less than about ½ the pickup vibration frequency.

As probe tip 22 vibrates in relationship to rotating object 12, the resonant frequency of sensor oscillator 34 will vary with the instantaneous standoff distance S with resultant effective frequency modulation of the sensor oscillator output reflecting the dimensional and surface variations passing through the pickup field of view.

The frequency modulation is converted into a low frequency amplitude analog signal carrying the desired standoff and surface variation information by mixer 36 and discriminator 38. The average signal level is obtained by detector 48 and filter 50, and linearized, if desired, by arbitrary again function sensitivity control 54. Then, with the arbitary zero point previously set, the signal on lead 62 to utilization device 64 will reflect surface variations including flat spot 18 (and ripples 16, if the spatial frequency is low enough) in terms of positive or negative excursions about the arbitrary zero point.

Several variations of the above-described system are contemplated within the scope of this invention. Such modifications include substantial variation in the pickup configuration which has been shown only in schematic and simplified form for illustration herein. Modified pickup configurations would permit measurement, for example, of the uniformity of inside diameter of a pipe or tube or other hollow elongated objects.

Another modification contemplated would involve increase in the operational frequencies, both as to the rest frequency of sensor oscillator 34 and the drive frequency for pickup 20. In the case of the latter, higher pickup drive frequencies would permit higher frequency pickup sensitivity, especially where directional demodulation or identification of surface variations at high spatial frequencies (e.g., the area of waviness 16 in FIG. 1) is desired.

With regard to increase in the sensor oscillator rest frequency, it has been found that the sensitivity of a probe tip 22 depends not only on the pickup to object spacing but also upon the frequency at which the probe tip capacitance is measured, especially in the case of inspection non-conductive objects. A practical result is that with a lower sensor oscillator frequency, the pickup tends to "see" a porous or ill-defined surface on non-conductive materials. As the sensor oscillator rest frequency, i.e., the frequency at which the capacitance of pickup 20 is measured, increases, the surface thickness effect is reduced and ultimately disappears below the inherent measurement accuracy of the system. Thus, while the exemplary values employed in the present description for the sensor oscillator rest frequency is 5.124 mHz., it should be appricated that values significantly below this are preferably not employed and that frequencies above this value, e.g., 10 mHz. to 50 mHz. or even higher, if possible, may be desirable for ultrahigh resolution inspection of non-conductive objects.

In addition to the foregoing, various circuit modifications and changes will be apparent to one skilled in the art in light of the foregoing description which do not constitute departures from the essence of the invention described. The present embodiments are, therefore, to be considered in all respects as illustrative and not respective, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A non-contact dimension comparator for measurement of dimensional and surface variations in an object under inspection comprising: a proximity sensitive pickup, exhibiting at least one variable electrical parameter as a function of the instantaneous pickup to object spacing; means for vibrating said pickup at a constant amplitude and frequency toward and away from said object under inspection, thereby producing time variation of said parameter associated with said constant frequency of vibration; means coupled to said pickup and responsive to said time varying parameter associated with said constant frequency of vibration to produce a time varying displacement analog signal having a component at said constant frequency of vibration, the amplitude of said component depending on the instantaneous variation of the pickup to object spacing and output means responsive to the amplitude of the component of said displacement analog signal at said constant frequency of vibration to produce an output representation of instantaneous variation of pickup to object spacing.

2. A non-contact dimension comparator as defined in claim 1 wherein said means for vibrating said pickup comprises at least one frequency conversion means adapted to be operated by a source of AC power and operative to generate an amplitude regulated signal at twice the AC power source frequency.

3. A non-contact dimension comparator as defined in claim 2 wherein said frequency conversion means comprises input circuitry for coupling to an AC power source, frequency doubler means connected to said input circuitry to generate a second harmonic of said input signal; processing means coupled to said frequency doubler means to produce a signal of constant peak amplitude; and means to recover from said signal of constant peak amplitude a substantially sinusoidal signal at twice the frequency of said AC power source.

4. A non-contact dimension comparator as defined in claim 3 wherein said frequency doubler means comprises a rectifier circuit.

5. A non-contact dimension comparator as defined in claim 3 wherein said processing means comprises high pass filter means coupled to said rectifier circuit; and limiter means coupled to said high pass filter means to generate a square wave output signal at twice the frequency of the AC power supply.

6. A non-contact dimension comparator as defined in claim 5 further including means to adjust said limiter amplifier to produce a substantially zero average value for said square wave output.

7. A non-contact dimension comparator as defined in claim 5 including second high pass filter means coupled to said rectifier; said rectifier means including a pair of transistors of opposite conductivity, each coupled to the output of one of said high pass filter means, and providing a common output to a single load; and means coupled to the input of both of said transistors to adjust the input bias to produce an output square wave with essentially zero average value.

8. A non-contact dimension comparator as defined in claim 2 wherein said frequency conversion means includes input circuitry for coupling to an AC power source; a full wave bridge rectifier coupled to said input circuitry; a pair of high pass filters coupled to said full wave rectifier; a limiter amplifier including first and second transistors of opposite conductivity, each connected to the output of one of said high pass filters; bias adjustment means connected to said limiter amplifier for adjusting the input bias to said first and second transistors whereby said limiter amplifier produces a square wave output signal at twice the frequency of the AC power source with an essentially zero average value.

9. A non-contact dimension comparator as defined in claim 1 wherein said pickup parameter time variation in response to changes in pickup to object spacing is a capacitance varying parameter in the form:

$$C(S)=K/S^n$$

where S is the instantaneous pickup to object spacing, K is a constant sensitivity coefficient, and $n$ is a small number; and where said means coupled to said pickup response to said time varying parameter associated with said frequency of vibration comprises a frequency modulation data channel.

10. A non-contact dimension comparator as defined in claim 1 wherein said means coupled to said pickup and responsive to said time varying parameter comprises a high frequency sensor oscillator coupled to said pickup and being responsive to pickup parameter variations to vary the rest frequency of said oscillator; mixer means coupled to said oscillator to provide an output signal having a downwardly shifted spectrum in relation to said sensor oscillator output; discriminator means coupled to said mixer means to produce said displacement analog signal from said downwardly shifted spectrum; and frequency control means coupled to said discriminator and operative to adjust said sensor oscillator frequency to maintain said downwardly shifted spectrum at a desired center frequency.

11. A non-contact dimension comparator as defined in claim 10 wherein said discriminator means includes a first narrow band crystal filter resonant at a frequency slightly above the desired center frequency for said downwardly shifted spectrum; a second narrow band crystal filter resonant at a frequency slightly below the desired center frequency for said downwardly shifted spectrum, first rectifier means coupled to one of said crystal filters to produce negative output signal pulsations, second rectifier means coupled to the second of said crystal filters to produce positive output pulsations; ripple filter means coupled to each of said rectifier means; and summation circuitry coupled to said ripple filter means to produce the algebraic summation of said ripple filter outputs as said displacement analog signal.

12. A non-contact dimension comparator as defined in claim 1 wherein said output means includes means to develop a signal E(S) which varies with the instantaneous pickup to object spacing S in accordance with the relationship:

$$E(S)=K/S^n$$

13. A non-contact dimension comparator as defined in claim 12 including linearizing means coupled to said output means including amplitude sensing means to provide a linearized signal $E_L(S)$ as a function of the instantaneous pickup to object spacing in the form:

$$E_L(S)=K'S$$

where K' is a constant sensitivity coefficient.

14. A non-contact dimension comparator as defined in claim 13 wherein said linearizing means comprises an amplifier and means responsive to the amplifier input signal level to vary the amplifier gain.

15. A non-contact dimension comparator as defined in claim 14 wherein said gain is varied on a stepwise basis with constant gain between predetermined values of the input signal amplitude.

16. A non-contact dimension comparator as defined in claim 15 including amplifier means with high open-loop gain; and a feedback circuit including a first resistive branch, and a plurality of parallel branches each including a variable resistance and diode means having a predetermined conduction threshold; the predetermined conduction threshold of said diodes being selected to produce successive insertion of parallel branches into said feedback circuit as the input signal amplitude increases.

17. A non-contact dimension comparator as defined in claim 12 wherein said means including amplitude sensing means comprises a narrow band filter resonant at the frequency of pickup vibration; average detector means coupled to said narrow band filter means; and adjustable low pass filter means coupled to the input of said detector means.

18. A non-contact dimension comparator as defined in claim 1 wherein said displacement analog signal includes an amplitude modulation spectrum with center frequency at the frequency of pickup vibration and corresponding to the instantaneous variation of pickup to object spacing; and wherein said output means comprises an AM detector to recover the portion of said amplitude modulation spectrum within a predetermined frequency band.

19. A non-contact dimension comparator as defined in claim 1 wherein said means includes means to establish an arbitrary zero reference whereby said measurement output is presented in the form of positive and negative departures from said reference.

20. A non-contact dimension comparator as defined in claim 1 wherein said pickup exhibits a time varying capacitance which varies non-linearly as a function of pickup to object spacing; wherein said means for vibrating said pickup includes means for connection to an AC power supply to double the AC power supply frequency and to provide an amplitude regulated output in essentially sinusoidal form; wherein said means coupled to said proximity sensitive pickup and responsive to said time varying parameter comprises a high frequency oscillator, the resonant frequency of which is adapted to be modified in response to variations in said pickup capacitance, means coupled to said oscillator to produce a downwardly shifted frequency spectrum in relation to that of said oscillator, means including a tuned crystal discriminator for producing an amplitude analog signal from said downwardly shifted spectrum in the form of a center frequency at said frequency of pickup vibration with an amplitude modulation spectrum associated therewith representing instantaneous variation of the pickup to object spacing, automatic frequency control means coupled to the output of said discriminator to adjust the sensor oscillator frequency to maintain the center frequency of said downwardly shifted spectrum at a predetermined value; wherein said output means comprises a narrow band filter resonant at the frequency of pickup vibration, average detector means coupled to said narrow band filter and low pass filter means coupled to the output of said average detector to provide an output signal constituting the portion of said amplitude modulation spectrum within a predetermined frequency band, said signal being a function of the instantaneous pickup to object spacing and having the form:

$$E(S)=K/S^n$$

means connected to said low pass filter to linearize said signal E(S) by producing an output signal in the form of $E_L(S)=K'S$; means coupled to the output of said linearizing means and to an adjustable signal source for producing an arbitrary zero reference level for a given value of $E_L(S)$; whereby the output of said non-contact dimension comparator is indicated by positive and negative departures from said arbitrary zero level.

References Cited

UNITED STATES PATENTS

| | | | |
|---|---|---|---|
| 3,379,972 | 4/1968 | Foster et al. | 324—61 |
| 3,398,297 | 8/1968 | Huen | 328—20 X |
| 3,421,077 | 1/1969 | Liu et al. | 324—61 |

OTHER REFERENCES

Foster, G. B.: Noncontacting Self Calibrating Vibration Transducer, in instrument & Control System, December 1963, vol. 36, pp. 83–84.

EDWARD E. KUBASIEWICZ, Primary Examiner

U.S. Cl. X.R.

321—69

PO-1050
(5/69)

UNITED STATES PATENT OFFICE
CERTIFICATE OF CORRECTION

Patent No. 3,541,435                    Dated    November 17, 1970

Inventor(s)    GEORGE B. FOSTER and EUGENE R. LUCKA

It is certified that error appears in the above-identified patent and that said Letters Patent are hereby corrected as shown below:

Column 1, line 44, "3,379,972" should read -- 3,452,273 --
Column 1, line 68, change "linar" to -- linear --. Column 3, line 3 "opeartes" should read -- operates --; line 11, "freqeuncy" should read -- frequency --; line 26, "elminated" should read -- eliminated --; line "asynchronims" should read -- asynchronism. Column 5, line 20, "electode should read -- electrodes are --. Column 7, line 11, "E (S) - K'S" shoul -- $E_L(S) = K'S$ --; line 56, "potentiommeter" should read -- potentiometer --. Column 8, line 11 "square" should read -- squa Column 10, line 47, cancel "be" (first occurrence); line 67, "discrimiina should read -- discriminator --; line 74, "conected" should read -- conne Column 13, line 20, "feld" should read -- field --; line 37, "again" shou read -- gain --; line 38, "arbitary" should read -- arbitrary --; line 66 "lower" should read -- low --; line 75, "appricated" should read -- appre Column 14, line 11, "respec-" should read -- restric- --. Column 15, lin "varying parameter" should read -- variation --; line 66, cancel "includi amplitude sensing means". Column 16, line 30, after "said", insert -- output --.

Signed and sealed this 24th day of August 1971.

(SEAL)
Attest:

EDWARD M. FLETCHER, JR.
Attesting Officer

WILLIAM E. SCHUYLER, JR.
Commissioner of Patents